(12) United States Patent
Cho et al.

(10) Patent No.: US 11,483,539 B2
(45) Date of Patent: Oct. 25, 2022

(54) APPARATUS AND METHOD FOR GENERATING THREE-DIMENSIONAL IMAGE USING OPTICAL SYSTEM DIRECTING LIGHT IN A DOT PATTERN

(71) Applicant: LG ELECTRONICS INC., Seoul (KR)

(72) Inventors: Yongho Cho, Seoul (KR); Hyojin Nam, Seoul (KR); Sangkeun Lee, Seoul (KR); Chansung Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/284,410

(22) PCT Filed: Apr. 4, 2019

(86) PCT No.: PCT/KR2019/003979
§ 371 (c)(1),
(2) Date: Apr. 9, 2021

(87) PCT Pub. No.: WO2020/075932
PCT Pub. Date: Apr. 16, 2020

(65) Prior Publication Data
US 2022/0007003 A1    Jan. 6, 2022

Related U.S. Application Data

(60) Provisional application No. 62/743,553, filed on Oct. 10, 2018.

(51) Int. Cl.
*H04N 13/271*    (2018.01)
*H04N 13/254*    (2018.01)
*H04N 13/156*    (2018.01)

(52) U.S. Cl.
CPC ......... *H04N 13/271* (2018.05); *H04N 13/156* (2018.05); *H04N 13/254* (2018.05)

(58) Field of Classification Search
CPC .......................... H04N 13/271; H04N 13/254
See application file for complete search history.

(56) References Cited

U.S. PATENT DOCUMENTS 10,957,059 B1 *    3/2021    Katz ................... H04N 13/327
2015/0062558 A1    3/2015    Koppal et al.
(Continued)

FOREIGN PATENT DOCUMENTS

JP    2010130408    6/2010
KR    1020160142839    12/2016

OTHER PUBLICATIONS

PCT International Application No. PCT/KR2019/003979, Written Opinion International Searching Authority dated Jul. 31, 2019, 17 pages.

*Primary Examiner* — Jayanti K Patel
*Assistant Examiner* — Christopher Kingsbury Glover
(74) *Attorney, Agent, or Firm* — Lee, Hong, Degerman, Kang & Waimey PC

(57) ABSTRACT

A depth image generation apparatus is disclosed including a light source for generating light to be emitted toward an object in order to solve an SNR problem caused by resolution degradation and an insufficient amount of received light, while not increasing a light-emitting amount when photographing a remote object; a first optical system for emitting a dot pattern at the object, the light generated by the light source; an image sensor for receiving light reflected from the object and converting the light into an electrical signal; an image processor for acquiring depth data through the electrical signal; and a control unit connected to the light source, the first optical system, the image sensor and the image (Continued)

processor, where the control unit controls the first optical system so as to scan the object by moving the dot pattern in a preset pattern.

12 Claims, 16 Drawing Sheets

(56) References Cited

U.S. PATENT DOCUMENTS

| | | |
|---|---|---|
| 2017/0030708 A1* | 2/2017 | Albert .................... G01S 17/87 |
| 2017/0163969 A1* | 6/2017 | Cronie ................ G06V 10/145 |
| 2018/0100733 A1* | 4/2018 | Thuries ................ G02B 3/0056 |
| 2020/0092533 A1* | 3/2020 | Narasimhan .......... G01S 7/4914 |
| 2020/0112713 A1* | 4/2020 | Li ........................ H04N 13/296 |

* cited by examiner

PRIOR ART

PRIOR ART

APPARATUS AND METHOD FOR GENERATING THREE-DIMENSIONAL IMAGE USING OPTICAL SYSTEM DIRECTING LIGHT IN A DOT PATTERN

CROSS-REFERENCE TO RELATED APPLICATIONS

This application is the National Stage filing under 35 U.S.C. 371 of International Application No. PCT/KR2019/003979, filed on Apr. 4, 2019, which claims the benefit of U.S. Provisional Application No. 62/743,553, filed on Oct. 10, 2018, the contents of which are all hereby incorporated by reference herein their entirety.

TECHNICAL FIELD

The present disclosure relates to an apparatus and method for generating a three-dimensional image, and more particularly, to an apparatus and method for measuring depth information of an object and generating a three-dimensional image based on the measured depth information of the object.

BACKGROUND ART

A three-dimensional stereoscopic image is generated based on a depth image of an object together with a color image to provide a stereoscopic effect and immersion. In this case, a depth of the object should be measured to generate a depth image of the object.

There is a Time of Flight (TOF) scheme as one of methods for measuring a depth of an object. The TOF scheme is a scheme for measuring a depth of an object by calculating a time of reflective light returning from an object after directly irradiating light to the object.

FIG. 1 illustrates the structure of a general TOF camera 100. The TOF camera 100 may include a light transmitter 110 configured to emit light to an object and a light receiver 120. That is, the TOF camera 100 may obtain depth information, which is the distance between the camera and object, based on the phase difference between the light emitted from the light transmitter 110 and light reflected by the object. Specifically, one pixel of an image sensor of the TOF camera 100 may include an in-phase receptor for receiving in-phase light from the light reflected by the object and an out-phase receptor for receiving out-phase light from the light. That is, the TOF camera 100 may measure the phase difference between the emitted light and the light reflected by the object based on the light received by the in-phase and out-phase receptors and obtain the depth information of the object.

FIG. 2 illustrates the optical structure of a conventional TOF camera 100, and FIG. 3 is a block diagram illustrating the conventional TOF camera 100.

A light transmitter 110 of the conventional TOF camera 100 may include a light source 111 configured to generate light and a diffuser 112 configured to emit the light generated by the light source 111 in the form of a surface light source at a specific angle.

The light emitted from the light transmitter 110 is reflected by an object 300 and then received by a light receiver 120. The light receiver 120 may include a reception (Rx) lens 121 configured to guide the light reflected by the object 300 to an image sensor 122, the image sensor 122 configured to convert the received light into an electrical signal, and an image processor 123 configured to generate a depth image based on the electrical signal from the image sensor 122. In some cases, the light receiver 120 may further include a filter configured to pass a specific wavelength.

The TOF camera 100 based on the TOF method may be applied to various fields such as automotive (camera for vehicles), virtual reality (VR), robots, people counting, surveillance, etc. However, considering that light is emitted from the light transmitter 100 of the TOF camera 100 to measure depth information, the strength of the light is limited to protect the eyes of a subject (person). When the strength of the light emitted to the object 300 is reduced, the signal-to-noise ratio (SNR) may increase due to an insufficient amount of light received by the light receiver 120. When a distant subject is photographed or when the effects of external light increase, the reliability of the obtained depth image may be degraded.

Further, when the distant subject is photographed, the size of a divided area corresponding to each receiving element of the image sensor 122 increases so that the resolution of the depth image relatively decreases.

DISCLOSURE OF THE INVENTION

Technical Problem

The present disclosure is to obviate one or more problems due to limitations and disadvantages of the related art, and an object of the present disclosure is to enhance reliability of a depth image acquired from a distance photographing while restricting the amount of light generated from a light source to protect a user's eyes.

Technical Solutions

To achieve this object and other advantages, according to one aspect of the present disclosure, a depth image generating apparatus comprises a plurality of light sources for generating light irradiated toward an object; a first optical system irradiating the light generated by each of the light sources to the object in a dot pattern; an image sensor for receiving light reflected in the object and converting the received light into an electrical signal; an image processor for acquiring depth data through the electrical signal; and a controller connected to the light sources, the first optical system, the image sensor and the image processor, wherein the controller controls the light sources to scan the object by controlling a light emitting pattern of the plurality of light sources.

Also, in accordance with one embodiment, the present disclosure provides a depth image generating apparatus in which the plurality of light sources emit light independently.

Also, in accordance with one embodiment, the present disclosure provides a depth image generating apparatus in which irradiation light of the dot pattern generated from each of the plurality of light sources corresponds to divided areas corresponding to a plurality of receiving elements constituting the image sensor one-to-one.

Also, in accordance with one embodiment, the present disclosure provides a depth image generating apparatus in which the divided area includes sub-divided areas respectively corresponding to the plurality of light sources, and the irradiation light of the dot pattern generated from each of the plurality of light sources is irradiated to a corresponding sub-divided area.

Also, in accordance with one embodiment, the present disclosure provides a depth image generating apparatus in which the sub-divided area has a size proportional to a maximum amount of light emitted from each of the plurality of light sources.

Also, in accordance with one embodiment, the present disclosure provides a depth image generating apparatus in which the controller controls the plurality of light sources to emit light in due order for one frame, and controls the image processor to combine depth data respectively acquired using position information of each sub-divided area.

Also, in accordance with one embodiment, the present disclosure provides a depth image generating apparatus in which the controller controls the amount of light emitted from the plurality of light sources to correspond to at least one of a distance and signal to noise ratio (SNR) with the object.

Also, in accordance with one embodiment, the present disclosure provides the depth image generating apparatus in which the controller controls the number of light sources emitting light at the same time among the plurality of light sources for one frame to correspond to at least one of a distance and signal to noise ratio (SNR) with the object.

Also, in accordance with one embodiment, the present disclosure provides the depth image generating apparatus in which the controller controls the image processor to increase a frame rate when at least one of the plurality of light sources emits light once.

Also, in accordance with one embodiment, the present disclosure provides the depth image generating apparatus in which the controller divisionally controls the plurality of light sources to emit light twice for one frame and controls the image processor to implement an HDR through the respectively acquired depth data, but number of the plurality of light sources is classified differently.

Also, in accordance with one embodiment, the present disclosure provides the depth image generating apparatus in which the controller differently controls an amount of light emitted from the plurality of light sources for each of N frame and N+1 frame, and controls the image processor to implement an HDR through the respectively acquired depth data.

Also, in accordance with one embodiment, the present disclosure provides the depth image generating apparatus in which the first optical system includes a collimator lens condensing light irradiated from the plurality of light sources into parallel light, and a diffractive optical element irradiating the parallel light toward the object in the dot pattern.

Also, in accordance with one embodiment, the present disclosure provides the depth image generating apparatus in which the image sensor includes multiple array receiving elements of a single photon avalanche diode (SPAD) array type corresponding to the dot pattern.

Also, in accordance with one embodiment, the present disclosure provides the depth image generating apparatus further comprising a second optical system matching reflective light of the dot pattern with the multiple array receiving elements to allow the light to enter there.

Also, in accordance with one embodiment, the present disclosure provides the depth image generating apparatus in which the plurality of light sources are a plurality of vertical cavity surface emitting lasers (VCSEL).

Also, in accordance with one embodiment, the present disclosure provides a method for controlling a depth image generating apparatus comprising irradiating light toward an object in a dot pattern by using at least one of a plurality of light sources and acquiring primary depth data, acquiring a photographing environment and distance information of the object through the primary depth data, setting a light emitting pattern of the plurality of light sources based on the acquired photographing environment and distance information, and acquiring secondary depth data to correspond to the set light emitting pattern.

Also, in accordance with one embodiment, the present disclosure provides the method further comprising changing the set light emitting pattern based on the acquired photographing environment and distance information through the secondary depth data.

Advantageous Effects

The present disclosure may solve a problem of an insufficient light receiving amount, which may occur when light is irradiated to a long distance in the form of a surface light source.

The present disclosure may make sure of a sufficient light receiving amount and satisfy a limitation for eye protection by maintaining the amount of light generated by a light source and irradiating the light in a condensed dot pattern.

The present disclosure may acquire a depth image of high resolution by controlling a light emitting pattern of a plurality of light sources.

The present disclosure may acquire reliable depth data for a distant object by controlling the light emitting pattern of the plurality of light sources.

The present disclosure may implement an HDR by controlling the light emitting pattern of the plurality of light sources.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other. Also, in description of the embodiments disclosed in this specification, if detailed description of the disclosure known in respect of the present disclosure is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present disclosure.

Although the terms such as "first" and/or "second" may be used to describe various elements, it is to be understood that the elements are not limited by such terms. The terms may only be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" means that no third element exists therebetween.

It is to be understood that the singular expression includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Figure 4:
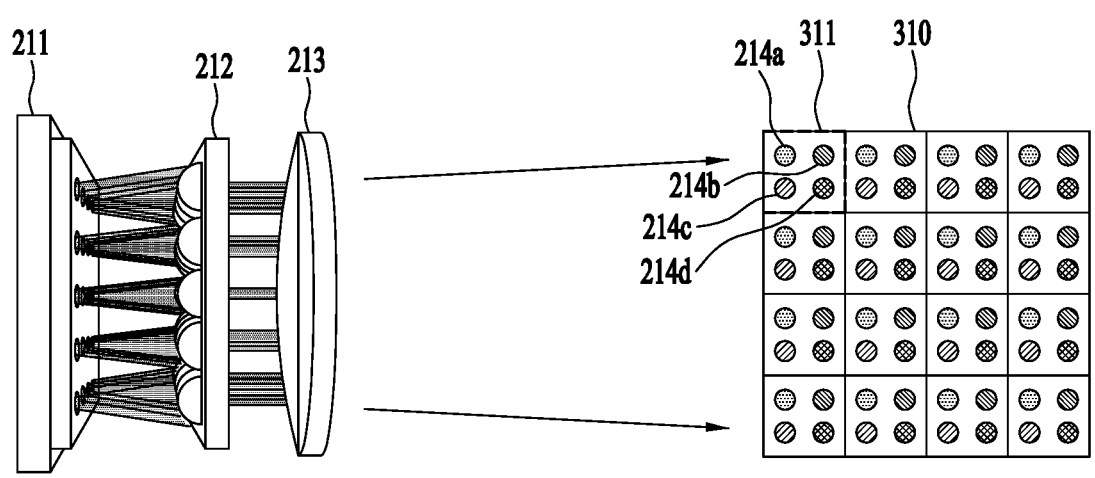
FIG. 4 illustrates an optical structure of a TOF camera according to one embodiment of the present disclosure.
Figure 5:
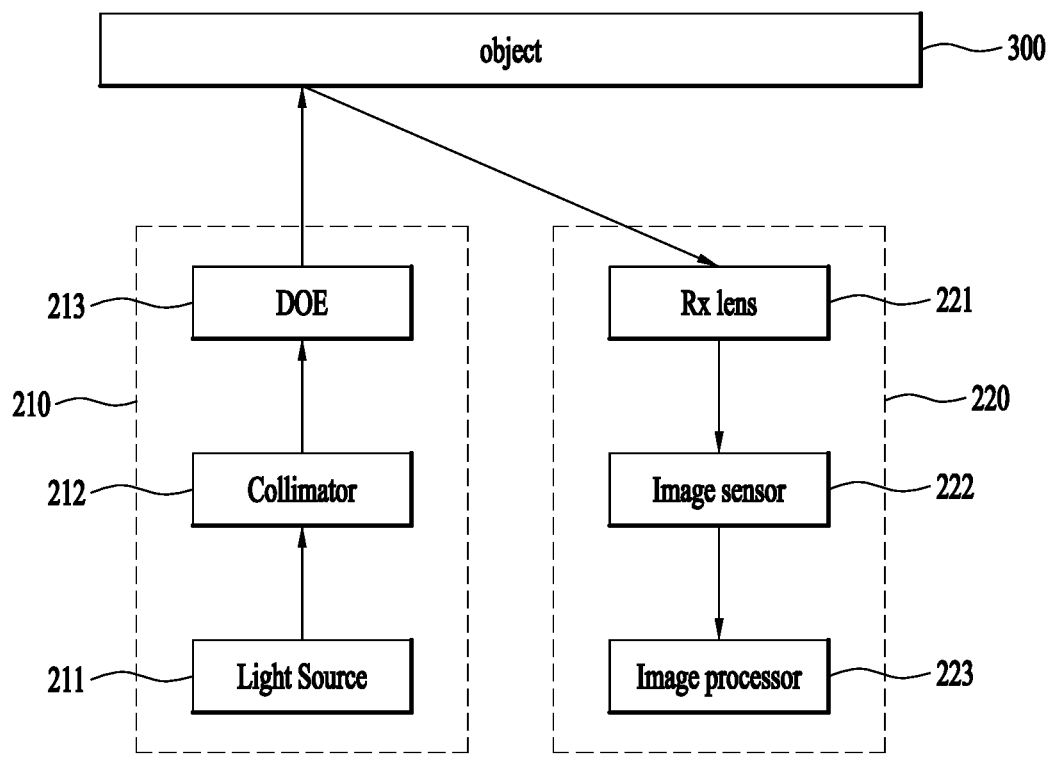
FIG. 5 illustrates a block diagram of a TOF camera according to one embodiment of the present disclosure.

FIG. 4 illustrates an optical structure of a TOF camera according to one embodiment of the present disclosure, and FIG. 5 illustrates a block diagram of a TOF camera according to one embodiment of the present disclosure.

The present disclosure relates to a TOF camera that acquires depth data of an object 300 by using a distance difference of light irradiated from a light transmitter 210, reflected in the object 300 and then received in a light receiver 220.

The light transmitter 210 may include a light source 211 generating light irradiated toward the object 300, and first optical systems 212 and 213 irradiating the light generated from the light source 211 to a dot pattern 214 of the object.

The light source 211 may be a vertical cavity surface emitting laser (VCSEL). The VCSEL is a laser for emitting light to a surface of an EPI wafer in a vertical direction unlike a general lateral light emitting laser. The VCSEL may include a plurality of cavities through which light emits and therefore, may be favorable in irradiating light in a dot pattern. Also, the VCSEL has strong linearity of light, which is irradiated, and light irradiated through one cavity may have an emitting angle of 10° to 20°. Also, the VCSEL may generate and irradiate light of a wavelength of 905 nm to 960 nm to acquire three-dimensional data.

Also, the light source 211 may include a plurality of light sources independently emitting light, and the respective light sources may irradiate light in a dot pattern so as not to overlap each other. A structure of the light source 211 and irradiation light of a dot pattern, which is irradiated from the light source, will be described in detail with reference to FIGS. 6 and 7.

The first optical systems 212 and 213 may include a collimator lens 212 condensing light irradiated from the light source 211 into parallel light, and a diffractive optical element (DOE) 213 irradiating the parallel light toward the object 300 in a dot pattern 214.

The collimator lens 212 may condense light emitted from each cavity of the VCSEL to make the parallel light.

The diffractive optical element 213 may irradiate the parallel light emitted from the collimator lens 212 toward the object 300 in the dot pattern 214 through diffractive property and interference of light based on a nano pattern. The nano pattern of the diffractive optical element 213 may be made of a UV resin having a period pattern of a nano structure on a glass substrate.

The light irradiated from the light transmitter 210 is reflected in the object 300 and then enters the light receiver 220, and the light receiver 220 may include an Rx lens 221 guiding the light reflected in the object 300 to an image sensor 222, the image sensor 222 converting the received light into an electrical signal, and an image processor 223 generating a depth image through the electrical signal of the image sensor 222. As the case may be, the light receiver 220 may further include a filter that passes through only a specific wavelength.

VGA grade (480×640) or more may be used as the image sensor 222, and the image sensor 222 may include multiple array receiving elements of a single photon avalanche diode (SPAD) array type, or a CMOS image sensor may be used as the image sensor 222. Each receiving element of the image sensor may include an in phase receptor receiving in phase light from the light reflected in an object and an out phase receptor receiving out phase light. The image processor 223 may measure a phase difference between the light irradiated through the light received by the in phase receptor and the out phase receptor and the light reflected in the object and acquire depth information of the object through the measured phase difference.

The image sensor 222 may include a plurality of receiving elements, and irradiation light of each of dot patterns 214a to 214d respectively irradiated from the plurality of light sources 211 may correspond to the respective receiving elements one-to-one. That is, the number of dot patterns 214a to 214d respectively irradiated from the plurality of light sources 211 may be more than resolution of the image sensor 222. In detail, the plurality of light sources 211 may respectively irradiate the dot patterns 214a to 214d to an irradiation area 310, wherein dots may enter divided areas 311 respectively corresponding to the receiving elements one by one. Regarding this, a detailed description will be given through FIG. 7.

The irradiation light of the dot patterns 214a to 214d respectively irradiated from the plurality of light sources 211 may enter a receiving element corresponding to a second optical system 221 (Rx lens).

The present disclosure may include a controller for controlling the light transmitter 210 and the light receiver 220, and the controller may control the light sources 211 to scan the object 300 by controlling a light emitting pattern of the plurality of light sources.

Figure 1:
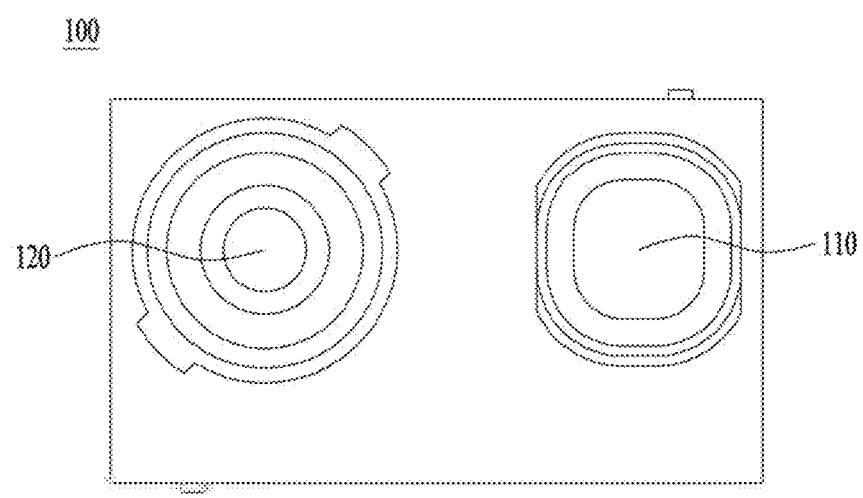
FIG. 1 illustrates a structure of a general TOF camera.
Figure 2:
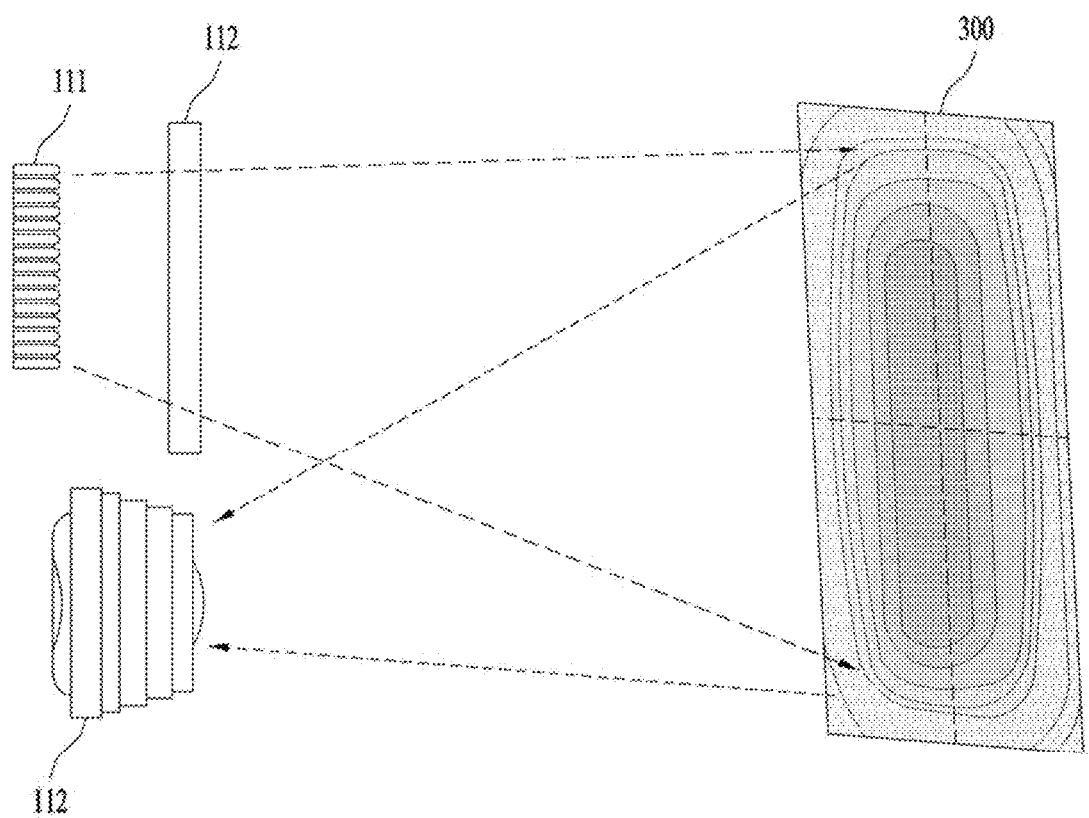
FIG. 2 illustrates an optical structure of an existing TOF camera.
Figure 3:
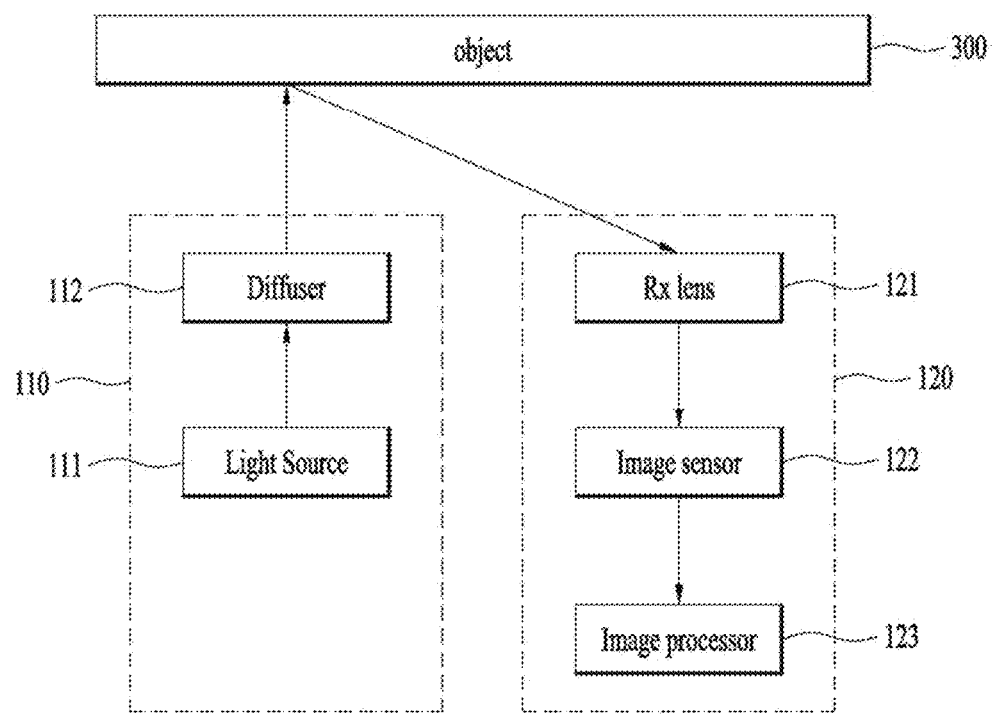
FIG. 3 illustrates a block diagram of an existing TOF camera.

The present disclosure is intended to solve the above problem that may occur by irradiating light to a surface light source like the TOF camera 100 of the related art described in FIG. 2 when a distant object 300 exists. When the TOF camera 100 of the related art takes the distant object 300, a first problem occurs in that resolution is deteriorated due to an increased divided area handled by each receiving element of the image sensor 222. Secondly, a problem may occur in that a signal to noise rate (SNR) is increased due to an insufficient amount of light received by each receiving element. The second problem may be solved by increase (=light source 211) of a power of the light source 211 but the light source 211 has a limitation in increasing the power to protect eyes and a problem of the cost may occur. Also, the first problem cannot be solved by only increase of the amount of light emitted from the light source 211.

In order to solve the above problems, the present disclosure adopts technical spirits for condensing and irradiating light generated from a plurality of light sources in and to the dot pattern 214 and controlling a light emitting pattern of the light sources to scan an object.

Figure 6:
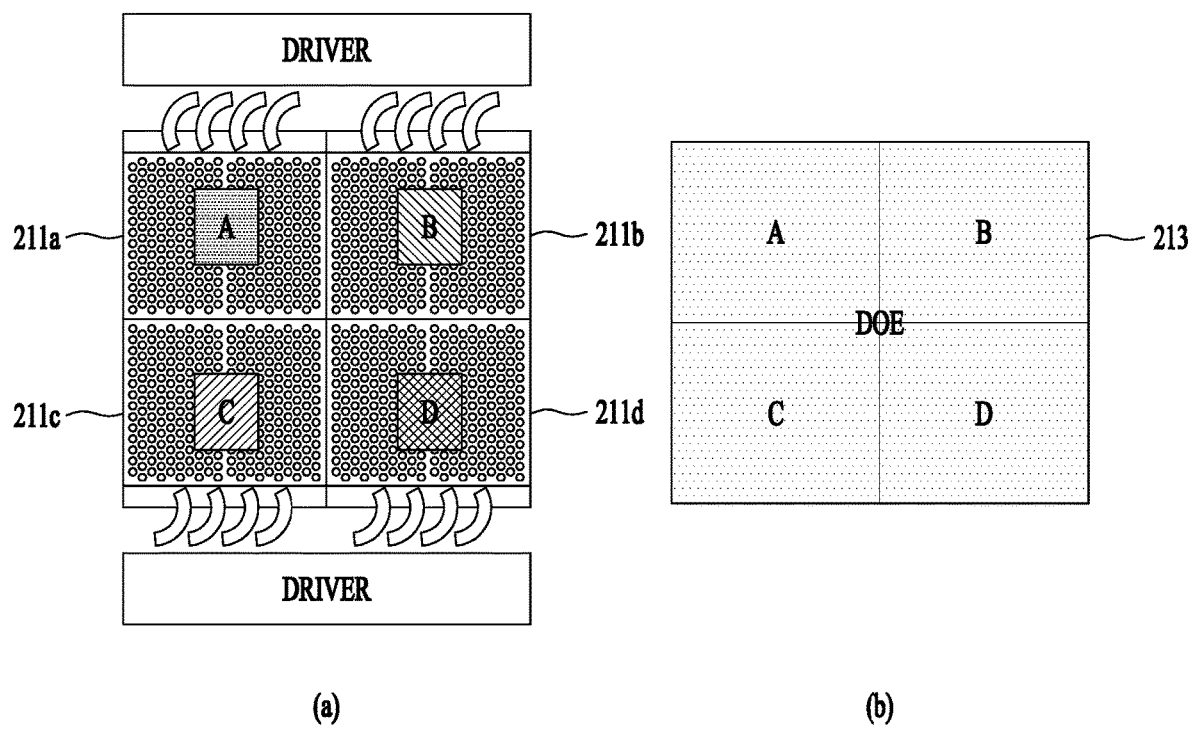
FIG. 6 illustrates light sources of a TOF camera and a diffractive optical element irradiating light irradiated from the light sources in a dot pattern in accordance with one embodiment of the present disclosure.
Figure 7:
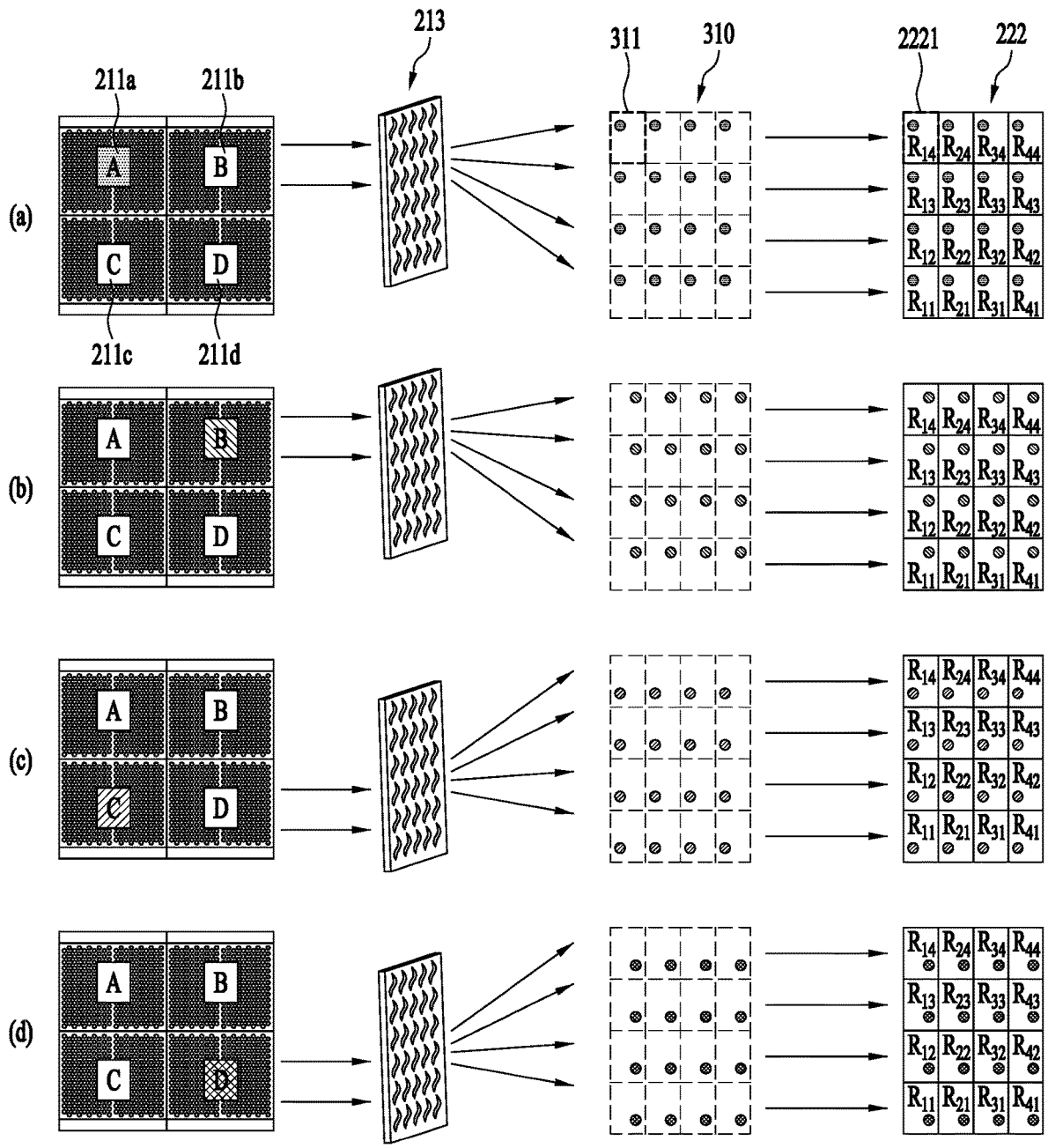
FIG. 7 illustrates dot patterns irradiated through light sources and a diffractive optical element of FIG. 6 in accordance with one embodiment of the present disclosure.

FIG. 6 illustrates light sources of a TOF camera and a diffractive optical element irradiating light irradiated from the light sources in a dot pattern in accordance with one embodiment of the present disclosure. FIG. 7 illustrates dot patterns irradiated through light sources and a diffractive optical element of FIG. 6 in accordance with one embodiment of the present disclosure.

The light source 211 of the present disclosure may include a plurality of light sources 211a and 211b independently emitting light. Each of the light sources 211a and 211d may be VSCEL independently emitting light. In detail, FIG. 6(a) illustrates a plurality of light sources 211a and 211d comprised of four VSCELs. Each of the light sources 211a and 211d may irradiate light of a dot pattern toward an object by means of a diffractive optical element 213 provided as shown in FIG. 6(b). Although FIG. 6(a) illustrates four light sources 211a and 211d, it is not required that the number of the light sources is limited to four.

The light generated from one light source (one of 211a and 211d) may be irradiated in a dot pattern to correspond to the divided areas 311 one-to-one. Also, the divided areas 311 may correspond to respective receiving elements 2221 of the image sensor 222 one-to-one. That is, the number of dot patterns generated by one light source (one of 211a and 211d) may be the same resolution of the image sensor 222.

The dot patterns irradiated from the respective light sources 211a and 211b may have different positions in the divided areas 311 constituting the irradiation area 310 by passing through the diffractive optical element 213. In detail, FIG. 7(a) illustrates an embodiment in which the dot patterns generated by the light irradiated from the first light source 211a are formed on a second quadrant of the divided areas 311. FIG. 7(b) illustrates an embodiment in which the dot patterns generated by the light irradiated from the second light source 211b are formed on a first quadrant of the divided areas 311. Also, FIG. 7(c) illustrates an embodiment in which the dot patterns generated by the light irradiated from the third light source 211c are formed on a third quadrant of the divided areas 311. Also, FIG. 7(d) illustrates an embodiment in which the dot patterns generated by the light irradiated from the fourth light source 211d are formed on a fourth quadrant of the divided areas 311.

That is, the present disclosure includes a plurality of light sources 211a and 211b, each of which generates irradiation light of a dot pattern, and the irradiation light may be irradiated to different positions of the divided areas 311.

Figure 8:
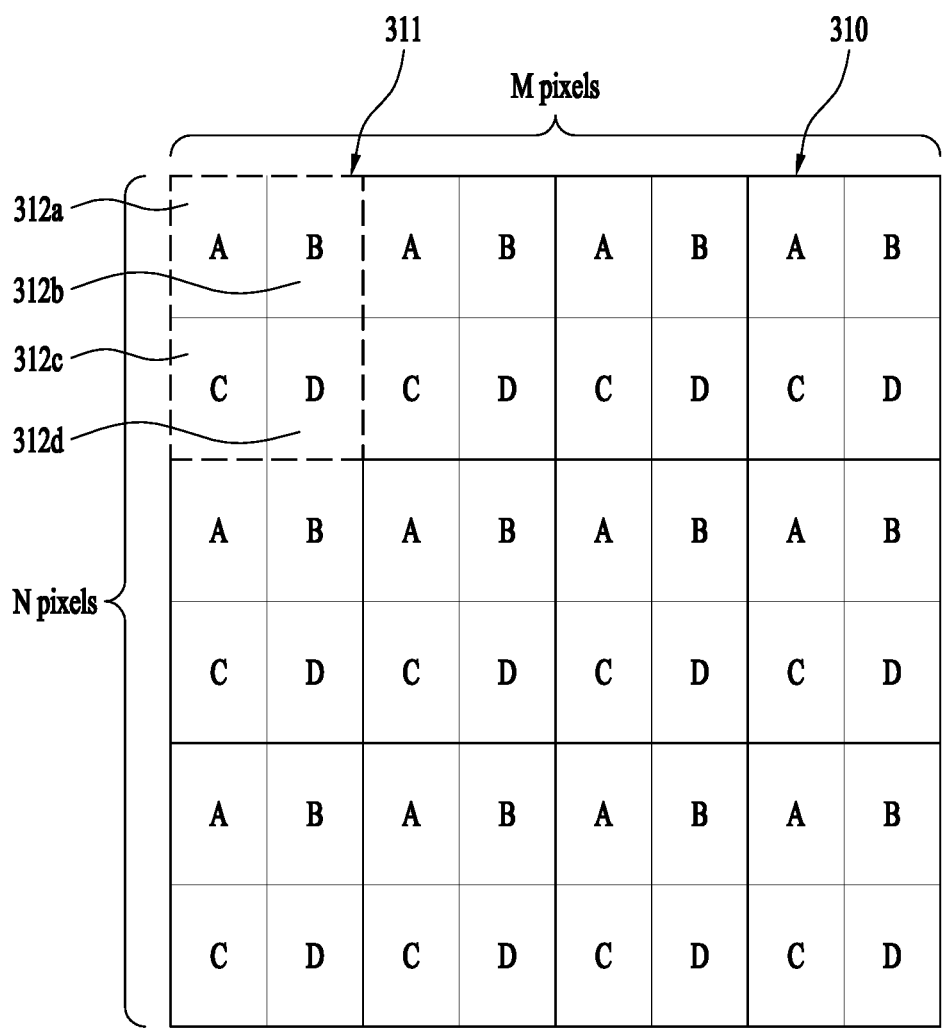
FIG. 8 specifically illustrates an irradiation area to which irradiation light of dot patterns is irradiated in accordance with one embodiment of the present disclosure.

FIG. 8 specifically illustrates an irradiation area to which irradiation light of dot patterns is irradiated in accordance with one embodiment of the present disclosure.

The irradiation area 310 is an area to which the dot patterns generated from the light sources 211a and 211b (see FIG. 6) are irradiated, and may be an area that includes an object 300 (see FIG. 5).

The irradiation area 310 may include divided areas 311 corresponding to receiving elements 2221 (see FIG. 7) of the image sensor 222 (see FIG. 7). That is, the number of the divided areas 311 may correspond to the number of resolutions of the image sensor 222.

The divided areas 311 may be divided into sub-divided areas 312a to 312d depending on a position to which the irradiation light of the dot patterns generated from the respective light sources 211a and 211d is irradiated. The dot pattern generated from the first light source 211a may be irradiated to the first sub-divided area 312a of the divided areas 311, the dot pattern generated from the second light source 211b may be irradiated to the second sub-divided area 312b of the divided areas 311, the dot pattern generated from the third light source 211c may be irradiated to the third sub-divided area 312c of the divided areas 311, and the dot pattern generated from the fourth light source 211d may be irradiated to the fourth sub-divided area 312d of the divided areas 311. That is, the dot patterns generated from the respective light sources 211a and 211d may correspond to the divided areas 311 one-to-one, and all the dot patterns generated from the plurality of light sources 211a and 211d may correspond to the sub-divided areas 312a to 312d, respectively.

Since the plurality of light sources 211a and 211d emit light independently, the dot patterns generated from the respective light sources 211a and 211d may be flickered independently.

Figure 9:
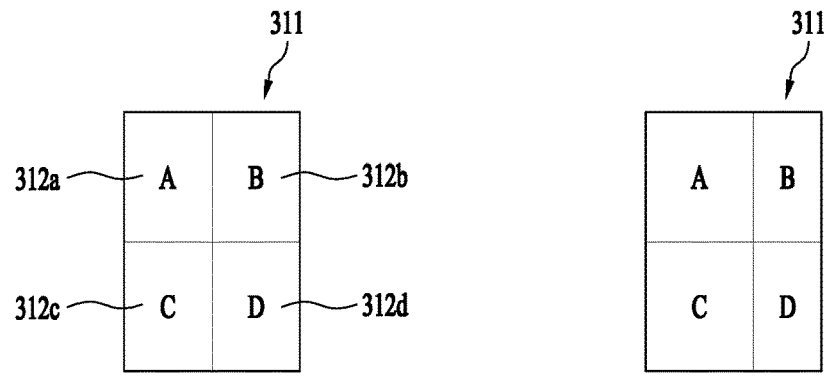
FIG. 9 illustrates a size and array of sub-divided areas in accordance with one embodiment of the present disclosure.
Figure 9:
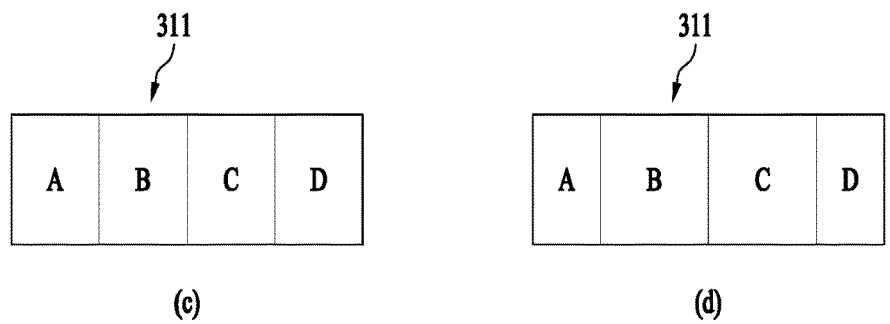
Figure 9:
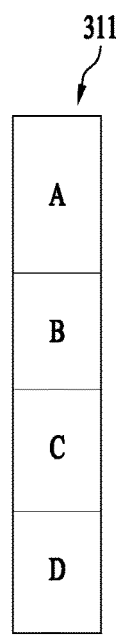

FIG. 9 illustrates a size and array of sub-divided areas in accordance with one embodiment of the present disclosure.

Although FIG. 8 illustrates that the sub-divided areas 312a to 312d have the same size, the sub-divided areas 312a to 312d may have their respective sizes different from one another, and a nano pattern of the diffractive optical element 213 and the Rx lens 221 may be freely selected for array.

In detail, FIGS. 9(a) and 9(b) illustrate an embodiment in which the sub-divided areas 312a to 312d are arrayed in the form of a quadrant, FIGS. 9(c) and 9(d) illustrate that the sub-divided areas 312a to 312d are arrayed horizontally, and FIG. 9(e) illustrates that the sub-divided areas 312a to 312d are arrayed vertically.

The size of the sub-divided areas 312a to 312d may be controlled by the nano pattern of the diffractive optical element 213. Alternatively, the size of the sub-divided areas 312a to 312d may be controlled by an irradiation angle of the light irradiated from each of the plurality of light sources 211a to 211d.

The size of the sub-divided areas 312a to 312d may correspond to the amount of light generated from the plurality of light sources 211a to 211d to the maximum. That is, the first light source 211a corresponding to a wide sub-divided area 312a (FIG. 9(b)) may generate the maximum amount of light greater than that generated from the second light source 211b corresponding to a narrow sub-divided area 312b (FIG. 9(b)). As a result, the controller of the present disclosure may selectively emit the light sources 211a and 211b in accordance with a photographing environment. For example, when a distant object is photographed, the light source that may generate the maximum amount of light may be used, and when a close object is photographed, the light source that may generate the minimum amount of light may be used.

Although resolution of a depth image is generally determined by the image sensor 222 (see FIG. 7), resolution may be selectively increased in the present disclosure. Regarding this, a description will be given hereinafter.

Figure 10:
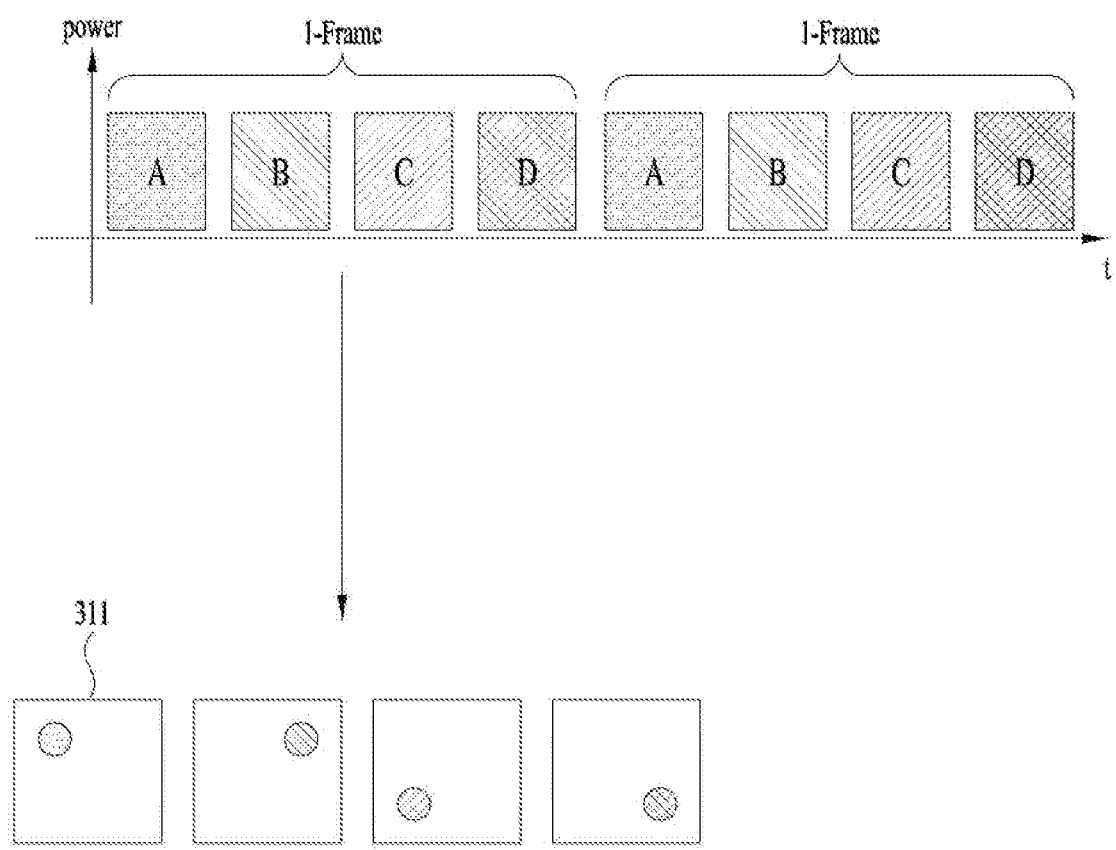
FIG. 10 illustrates a pattern for allowing a plurality of light sources to emit light to acquire a depth image of high resolution in accordance with one embodiment of the present disclosure.

FIG. 10 illustrates a pattern for allowing a plurality of light sources to emit light to acquire a depth image of high resolution in accordance with one embodiment of the present disclosure.

In the present disclosure, the plurality of light sources 211a to 211d sequentially emit light for one frame for taking an object, and depth data respectively acquired from the light sources 211a to 211d may be combined to enhance resolution. For example, when the number of the plurality of light sources 211a to 211d is four, depth data may be acquired with resolution corresponding to maximum four times of resolution of the image sensor 222 (see FIG. 7). Resolution may be controlled by the number of the light sources emitting light when the light sources 211a to 211d emit light in due order. That is, when four light sources emit light in due order, resolution corresponding to four times of resolution of the image sensor 222 may be acquired, and when three light sources emit light, resolution corresponding to three times of resolution of the image sensor 222 may be acquired.

In detail, FIG. 10 illustrates an embodiment in which four light sources emit light for one frame in due order to acquire a depth image of resolution corresponding to four times of resolution of the image sensor 222.

Figure 11:
FIG. 11 illustrates a method for acquiring a depth image of high resolution through the method of FIG. 10 in accordance with one embodiment of the present disclosure.

FIG. 11 illustrates a method for acquiring a depth image of high resolution through the method of FIG. 10 in accordance with one embodiment of the present disclosure.

The area 310 to which the light sources 211a to 211d are irradiated may be divided into the divided areas 311 to correspond to the receiving elements of the image sensor 222. When a surface light source irradiates light to the irradiation area 310 like the existing TOF camera, a depth image corresponding to resolution of the image sensor 222 may be acquired. However, in the present disclosure, light may be irradiated such that the dot patterns 214a to 214d respectively generated by the light sources 211a to 211d may correspond to the sub-divided areas 312a to 312d of the divided area 311 one-to-one, whereby resolution may be enhanced to a multiple as much as the number of the sub-divided areas 312a to 312d.

When the light sources 211a to 211d emit light in due order, the controller of the present disclosure may recognize corresponding coordinate information of the sub-divided areas 312a to 312d from the light sources 211a to 211d emitting light. The controller of the present disclosure may increase resolution by combining the respectively acquired depth data through the coordinate information of the sub-divided areas 312a to 312d. For example, when the first light source 221a emits light, the controller may recognize depth data acquired from the image processor 223 (see FIG. 5) as depth data of the first sub-divided area 312a. Also, when the second light source 221b emits light, the controller may recognize depth data acquired from the image processor 223 (see FIG. 5) as depth data of the second sub-divided area 312b. Also, when the third light source 221c emits light, the controller may recognize depth data acquired from the image processor 223 (see FIG. 5) as depth data of the third sub-divided area 312c. Also, when the fourth light source 221d emits light, the controller may recognize depth data acquired from the image processor 223 (see FIG. 5) as depth data of the fourth sub-divided area 312d. The controller may acquire depth data with resolution higher than that of the image sensor 222 by combining the acquired depth data using the coordinate information of each of the first to fourth sub-divided areas 312a to 312d.

In the present disclosure, a depth image may be acquired by adjusting a power of a light source. Regarding this, a description will be given with reference to FIG. 12.

Figure 12:
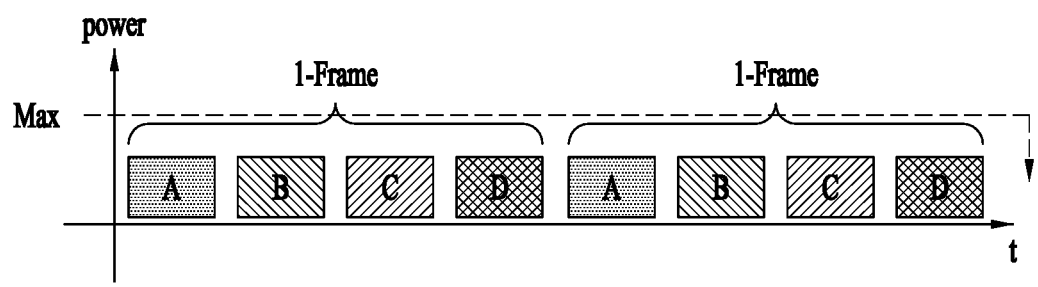
FIG. 12 illustrates a pattern for allowing a plurality of light sources to emit light to take a close object at high resolution in accordance with one embodiment of the present disclosure.

FIG. 12 illustrates a pattern for allowing a plurality of light sources to emit light to take a close object at high resolution in accordance with one embodiment of the present disclosure.

When a distant object is photographed, a power of each light source may be subjected to a maximum range for sequential photographing, whereby a depth image of high resolution may be acquired and an SNR problem may be avoided.

However, when a close object is photographed, the SNR problem may be avoided even though a power of each light source is weak. Also, it is advantageous in that power consumption may be reduced in addition to the SNR problem.

Therefore, when a close object is photographed at high resolution, the light sources 211a to 211d emit light in due order. However, even though the amount of light emitted from each of the light sources 211a to 211d is reduced, a depth image may be acquired at a low SNR.

In detail, FIG. 12 illustrates an embodiment in which the light sources 211a to 211d emit light in due order at the amount of light lower than the maximum amount of light that may be emitted therefrom. In this case, since the light sources 211a to 211d emit light in due order to acquire a depth image, the depth image of high resolution may be acquired and the light sources 211a to 211d may be driven at a low power.

Figure 13:
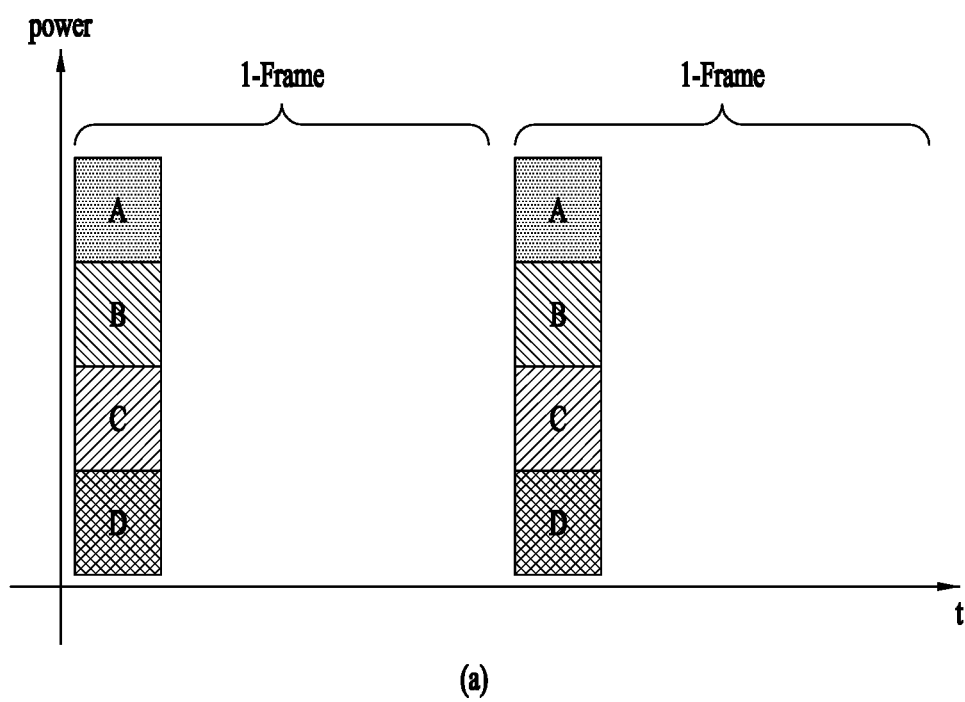
FIG. 13 illustrates a pattern for allowing a plurality of light sources to emit light to correspond to at least one of a distance of an object and a photographing environment without resolution gain in accordance with one embodiment of the present disclosure.
Figure 13:
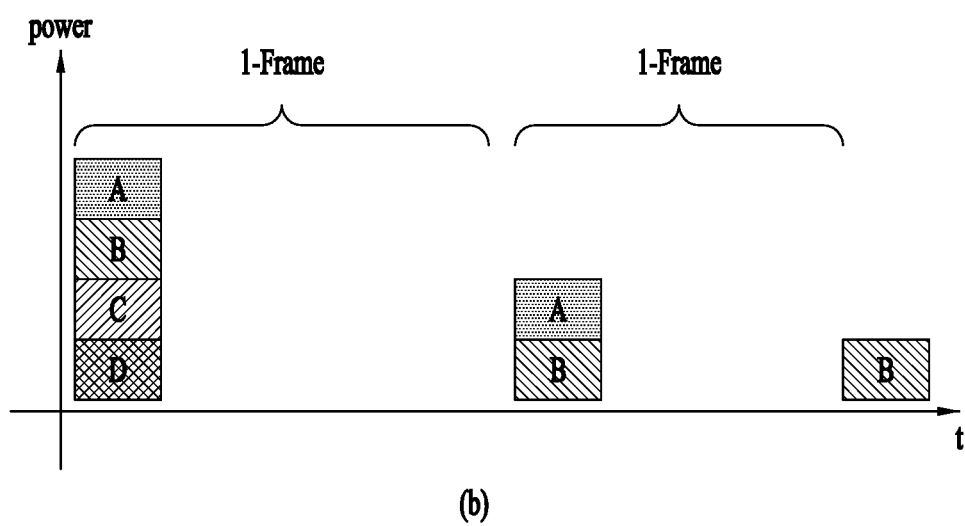
Figure 14:
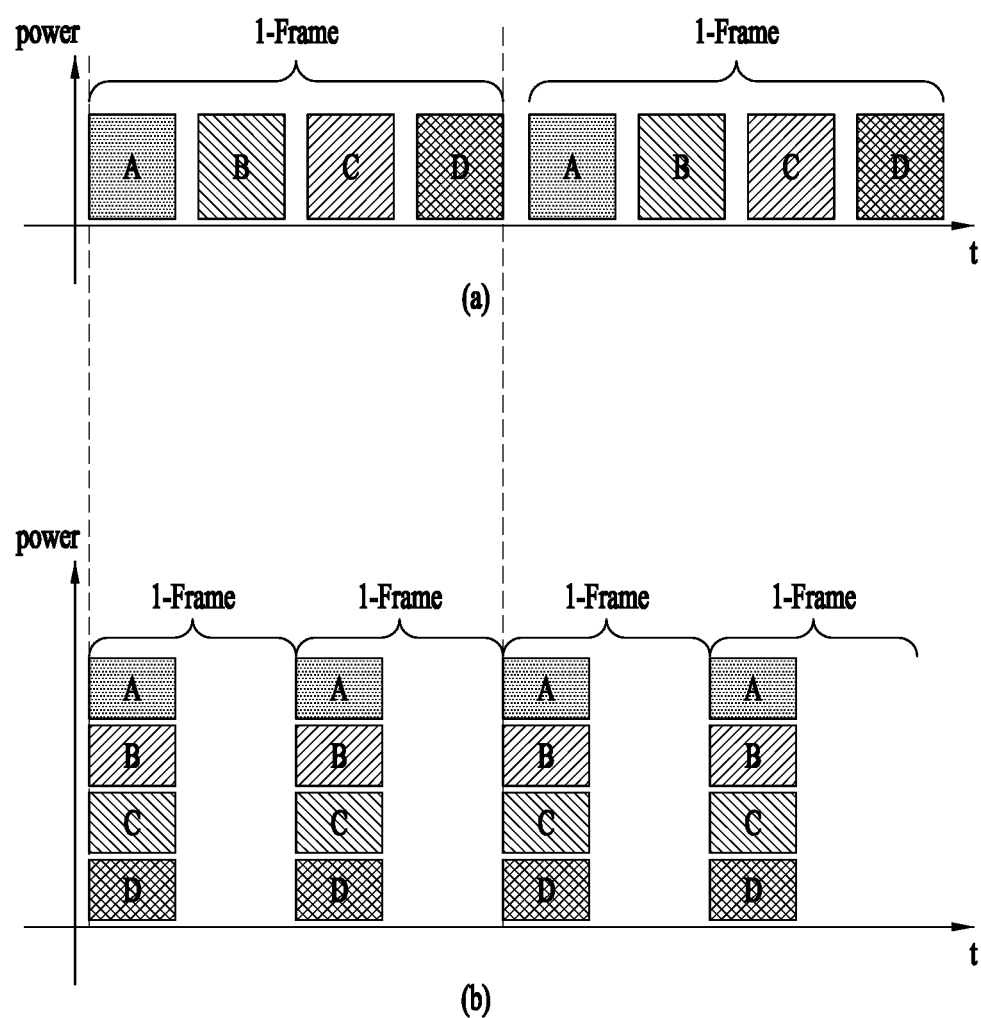
FIG. 14 illustrates a light emitting pattern for varying a frame rate while photographing an object without resolution gain in accordance with one embodiment of the present disclosure.

However, when a distance of an object is distant or an SNR is high due to external light, the method of FIG. 13 or FIG. 14 may not be suitable. In this case, it may be preferable that the light source emits light having a higher light emitting amount. Regarding this, a detailed description will be given with reference to FIG. 13.

FIG. 13 illustrates a pattern for allowing a plurality of light sources to emit light to correspond to at least one of a distance of an object and a photographing environment without resolution gain in accordance with one embodiment of the present disclosure.

The light emitting pattern described in FIG. 10 may have gain of resolution but the amount of light emission does not exceed the maximum amount of light emitted from each light source. Therefore, when a distance of an object is distant or an SNR is high due to external light, reliability of the depth data acquired by the light emitting pattern of FIG. 10 may be deteriorated.

When a distance of an object is distant or an SNR is high due to external light, it may be preferable to enhance the maximum amount of light emission. In order to increase the amount of light emission, the controller of the present disclosure may allow at least two of the plurality of light sources 211a to 211d to emit light at the same time for one frame. In detail, FIG. 13(a) illustrates an embodiment in which all of the plurality of light sources 211a to 211d emit light for one frame.

The number of light sources emitting light at the same time may be varied to correspond to at least one of the distance of the object and the SNR. This may enhance the amount of light emission when all of the plurality of light sources emit light but may damage eyes when light is irradiated toward the eyes and cause power consumption more than needs. Therefore, the number of light sources emitting light at the same time for next frame may be controlled based on the distance of the object and SNR information, which are acquired for one frame. In detail, FIG. 13(b) illustrates an embodiment in which the number of the plurality of light sources emitting light at the same for consecutive frames is varied.

When the plurality of light sources 211a to 211d emit light at the same time, it is difficult to acquire resolution gain but acquire gain at a frame rate. Regarding this, a description will be given with reference to FIG. 14.

FIG. 14 illustrates a light emitting pattern for varying a frame rate while photographing an object without resolution gain in accordance with one embodiment of the present disclosure.

The frame rate means a rate of a speed for photographing or reproducing continuous images, and the higher the frame rate is, the faster depth data acquired per second may be.

It is difficult for the light emitting pattern for resolution gain to enhance the frame rate because of the time required to emit (flicker) light from the plurality of light sources 211a to 211d in due order.

However, if resolution gain is abandoned, since the plurality of light sources 211a to 211d emit light (flicker) at the same time, the frame rate may be enhanced.

In detail, FIG. 14(a) illustrates a light emitting pattern for resolution gain, and FIG. 14(b) illustrates a light emitting pattern for acquiring frame gain while abandoning resolution gain. That is, in FIG. 14(b), resolution gain is abandoned but distance gain, SNR gain and frame rate gain may be acquired.

Figure 15:
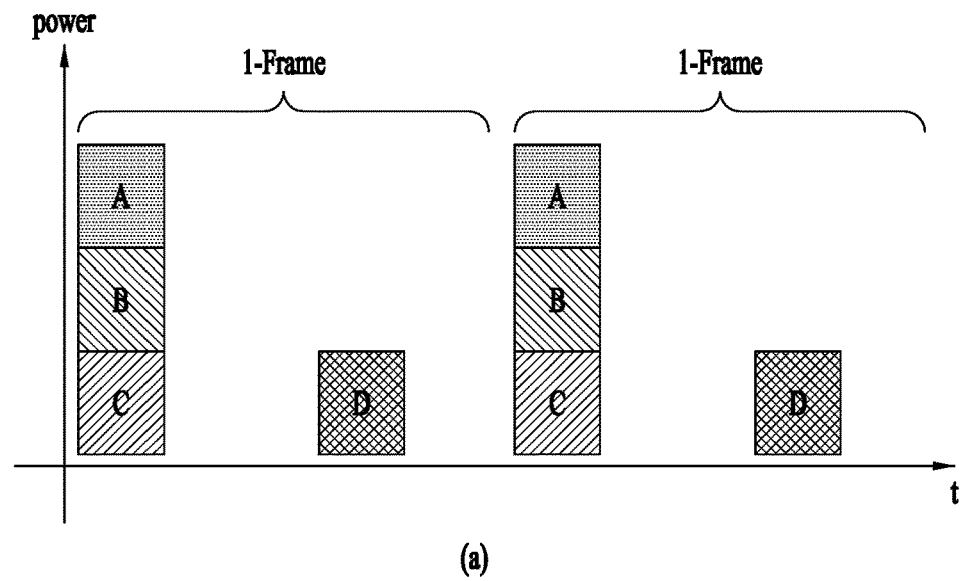
FIG. 15 illustrates a pattern for allowing a plurality of light sources to emit light to implement an HDR in accordance with one embodiment of the present disclosure.
Figure 15:
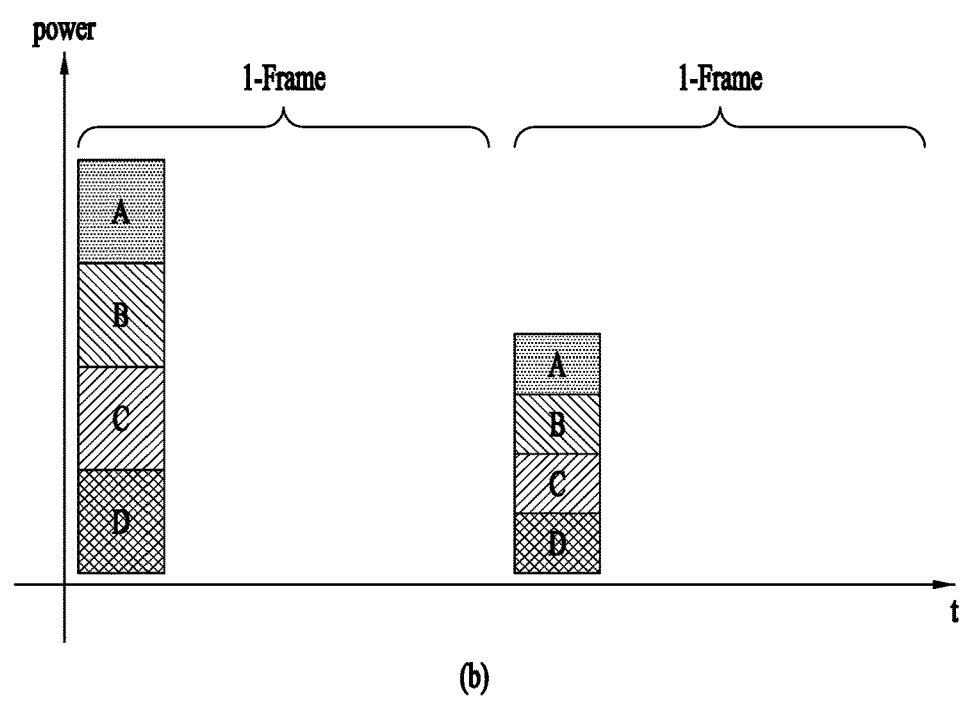

FIG. 15 illustrates a pattern for allowing a plurality of light sources to emit light to implement an HDR in accordance with one embodiment of the present disclosure.

A Dynamic Range (DR) means a range from the brightest portion to the darkest portion. The DR perceived by a person's eyes is about 10,000 nits, and an image input to the existing general display is a Low Dynamic Range (LDR) or Standard Dynamic Range (SDR) of about 100 nits and has a limitation in implementing a realistic image quality. The HDR enhances a contrast ratio (difference between the brightest portion and the darkest portion) of an image by more extending the existing DR, and expresses various kinds of brightness existing in reality, from intense light of sun to starlight of a dark night sky, thereby realistically transferring the image.

An HDR technique is an abbreviation of High Dynamic Range, and means a technique for combining photos of various gray scales into one. The HDR technique may be applied to the present disclosure. That is, in the present disclosure, a depth image of an object may be acquired by combining depth images acquired by varying the amount of light emission.

To this end, the controller of the present disclosure divisionally controls the plurality of light sources 211a to 211d to emit light twice for one frame, and controls the image processor 223 (see FIG. 5) to implement an HDR through the respectively acquired depth data, wherein the number of the plurality of light sources 211a to 211d may be classified differently. An embodiment regarding this is illustrated in FIG. 15(a). In detail, FIG. 15(a) illustrates an embodiment in which the first to third light sources 211a to 211c of the plurality of light sources 211a to 211d emit light at the same time to acquire a depth image, and the other fourth light source 211d emits light to acquire a depth image. The respectively acquired depth data are acquired based on different amounts of light emission, and in the present disclosure, the respectively acquired depth data may be combined to implement an HDR. When the plurality of light sources divisionally emit light for one frame, gain may be acquired in that the frame rate is not reduced.

However, the plurality of light sources 211a to 211d may be required to emit light at the same time to use the maximum amount of light emission. In this case, the depth data acquired by varying frame may be combined to implement an HDR. In detail, FIG. 15(b) illustrates an embodiment in which the depth data acquired by varying frame are combined to implement an HDR. The plurality of light sources 211a to 211d emit light at the same time for one frame to the maximum amount of light emission, and may emit light at the same time for next frame by reducing each amount of light emission. As the case may be, the depth image may be acquired by varying the number of the light sources emitting light for next frame.

Figure 16:
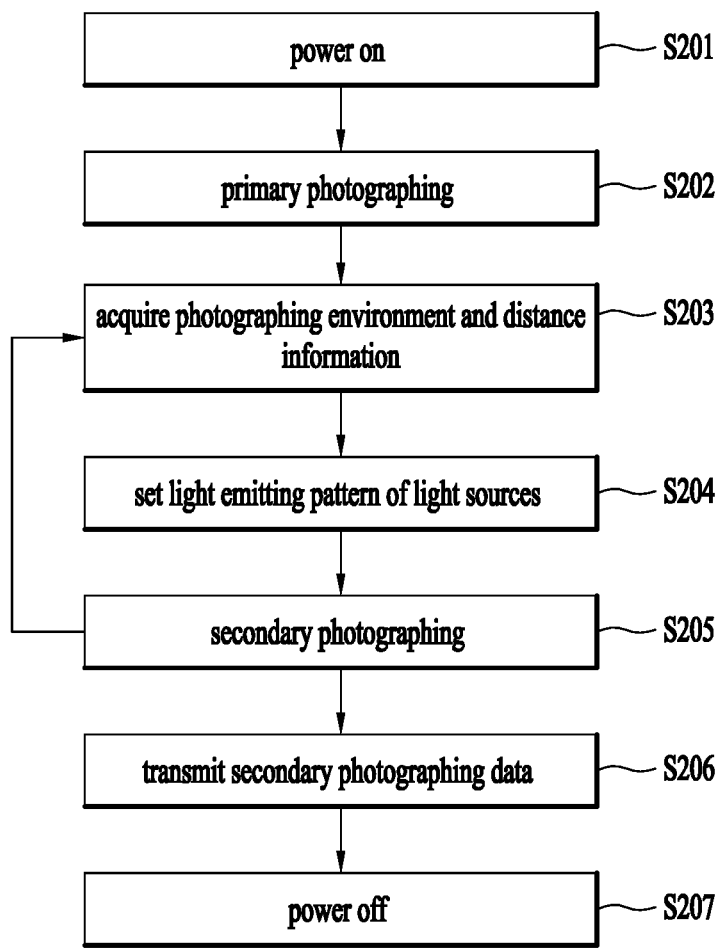
FIG. 16 illustrates a flow chart of setting a light emitting pattern of a plurality of light sources and acquiring depth data in accordance with one embodiment of the present disclosure.

FIG. 16 illustrates a flow chart of setting a light emitting pattern of a plurality of light sources and acquiring depth data in accordance with one embodiment of the present disclosure.

In the present disclosure, the controller may need previous information for setting the light emitting pattern of the light sources 211a to 211d. The previous information may include information as to distant photographing or close photographing, information as to whether an SNR is high, information as to whether resolution is proper, and information as to whether a higher frame rate is required.

In the present disclosure, the light emitting pattern may be set after primary photographing to acquire the previous information, and secondary photographing may be performed based on the set light emitting pattern.

In detail, in the present disclosure, if a depth image processor is powered on (S201), primary photographing may be performed to acquire the previous information (S202). The primary photographing may acquire depth data for at least one frame. The primary photographing is a step of setting a proper photographing mode for acquiring depth data for an object, and may be a step of acquiring primary depth data by varying the light emitting pattern of the light sources 211a to 211d.

A photographing environment and distance information of an object, which correspond to the previous information, may be acquired through the primary photographing (S203), and a light emitting pattern of the plurality of light sources corresponding to the acquired information may be set (S204). However, as the case may be, the light emitting pattern of the plurality of light sources may be changed by a user's selection.

If the light emitting pattern of the plurality of light sources is set, the secondary photographing may be performed based on the set light emitting pattern (S205), and secondary depth data may be acquired to correspond to the secondary photographing. The acquired secondary depth data may be transmitted to a display and provided as a preview screen or stored in a memory (S206). The secondary depth data may be used to change the set light emitting pattern. That is, if the photographing environment or the distance information of the object is varied through the secondary depth data, the light emitting pattern may be varied correspondingly and then photographing may be performed.

Afterwards, if the depth image processor is powered off by a user's selection (S207), the set light emitting pattern may be stored in the memory and then primary photographing may be performed based on the light emitting pattern. The proper light emitting pattern may be set and used to reduce the number of frames required to perform secondary photographing. However, as the case may be, the primary photographing may be step of performing photographing through a preset light emitting pattern.

The above detailed description should be considered in all respects as illustrative and not restrictive. The scope of the present disclosure should be determined by reasonable interpretation of the appended claims and all change which comes within the equivalent scope of the present disclosure are included in the scope of the present disclosure.

What is claimed is:

1. A depth image generating apparatus comprising:
   a plurality of light sources configured to emit light toward an object;
   a first optical system configured to direct the emitted light toward the object in a dot pattern;
   an image sensor configured to receive light reflected from the object and convert the received light to an electrical signal;
   an image processor configured to acquire depth data based on the electrical signal; and
   a controller operably coupled to the plurality of light sources, the first optical system, the image sensor, and the image processor,
   wherein:
   the controller is configured to control the plurality of light sources to scan the object by controlling the dot pattern;
   the plurality of light sources are configured to emit light independently;
   the dot pattern comprises divided areas respectively corresponding one-to-one to a plurality of receiving elements of the image sensor; and
   each divided area is sub-divided into sub-areas respectively corresponding to the plurality of light sources, and the dot pattern generated from each of the plurality of light sources is irradiated to a corresponding sub-divided sub-area.

2. The depth image generating apparatus of claim 1, wherein a size of each sub-divided sub-area is proportional to a maximum amount of light emitted from a corresponding light source.

3. The depth image generating apparatus of claim 1, wherein the controller is further configured to control the plurality of light sources to emit light in due order for one frame, and control the image processor to combine depth data respectively acquired for the one frame using position information of each sub-divided sub-area.

4. The depth image generating apparatus of claim 3, wherein the controller is further configured to control the amount of light emitted from the plurality of light sources based on at least one of a distance to the object or a detected signal to noise ratio (SNR).

5. The depth image generating apparatus of claim 1, wherein the controller is further configured to control a number of light sources among the plurality of light sources emitting light at the same time for one frame based on at least one of a distance to the object or a detected signal to noise ratio (SNR).

6. The depth image generating apparatus of claim 5, wherein the controller is further configured to control the image processor to increase a frame rate based on all of the plurality of light sources emitting light at the same time.

7. The depth image generating apparatus of claim 1, wherein the controller is further configured to control the plurality of light sources to emit light twice for one frame and control the image processor to generate a depth image using High Dynamic Range (HDR) based on the acquired depth data.

8. The depth image generating apparatus of claim 1, wherein the controller is further configured to control the plurality of light sources to emit light at different levels between two consecutive frames and control the image processor to generate a depth image using HDR based on the acquired depth data.

9. The depth image generating apparatus of claim 1, wherein the first optical system comprises:
   a collimator lens configured to condense light emitted from the plurality of light sources into parallel light; and
   a diffractive optical element configured to direct the parallel light toward the object in the dot pattern.

10. The depth image generating apparatus of claim 1, wherein the image sensor comprises multiple array receiving elements of a single photon avalanche diode (SPAD) array type corresponding to the dot pattern.

11. The depth image generating apparatus of claim 10, further comprising a second optical system configured to direct light reflected from the object in the dot pattern to correspondingly be received by the multiple array receiving elements.

12. The depth image generating apparatus of claim 11, wherein each of the plurality of light sources is a vertical cavity surface emitting laser (VCSEL).

* * * * *